July 1, 1958

L. ROBINSON 2,841,768

METHOD AND SYSTEM FOR CHECKING THE
SPEED-OUTPUT RELATIONSHIP
OF A GENERATOR
Filed Nov. 24, 1954

INVENTOR.
LEON ROBINSON
BY
James and Franklin
ATTORNEYS.

United States Patent Office 2,841,768
Patented July 1, 1958

2,841,768

METHOD AND SYSTEM FOR CHECKING THE SPEED-OUTPUT RELATIONSHIP OF A GENERATOR

Leon Robinson, Brooklyn, N. Y., assignor to Eastern Air Devices, Inc., Dover, N. H., a corporation of New York Application November 24, 1954, Serial No. 470,964

23 Claims. (Cl. 324—158)

The present invention relates to an improved method for checking the output of a generator operated over a range of speeds and determining whether the output-speed relationship thereof conforms to a predetermined pattern, and is particularly adapted for the precision checking of the linearity of output of tachometer generators.

In the past the speed-output relationship of a generator has been checked by operating the generator at a selected number of predetermined speeds, simultaneously measuring the speed of operation and the output thereof, usually the voltage, and then comparing those measurements in order to determine whether the speed-output relationship of the particular instrument conforms to specifications. This method is quite time consuming and is inherently inaccurate. It is time consuming because a large number of readings must be taken if the operation of the instrument over its entire speed range is to be checked, and because it usually takes an appreciable period of time before the instrument settles down at the speed at which each individual reading is to be taken. It is inaccurate because it is difficult to attain exactly the correct speed, except perhaps at a very few points within the desired range when a multiple speed synchronous motor is employed as a driving means, and because errors in determining the speed as well as errors in reading the actual magnitude of the output are both inescapable. It is further inaccurate because it is inherently an approximation, unless an infinite number of readings are taken throughout the range of operating speeds, a procedure impossible under the prior art technique.

This problem has been accentuated with the development of various control systems in which one of the signals is an electric voltage which must be directly proportional to the speed of operation of a particular component of that system. So-called tachometer generators are employed in such systems, these instruments being designed to produce a voltage output which is directly proportional to its speed of operation, that is to say, its voltage output must be linear with respect to speed within a given range of speeds. The actual magnitude of the voltage produced by such instruments at a given speed may vary from one instrument to another, within limits, but the output of each instrument must be linear with respect to speed, and that linearity must prevail throughout the entire predetermined range of operating speeds. It is, of course, impossible to produce a large number of identical instruments. Some variations necessarily result from a manufacturing process. Consequently each instrument must be individually tested to determine whether its speed-output relationship is linear within the desired degree of accuracy, an error of 1% usually being tolerated. Obviously, the measuring system employed must have an inherent accuracy considerably greater than the tolerance permitted. For a 1% tolerance a 0.1% accuracy in measurement is needed.

To check each such instrument individually in the manner previously employed in the prior art is quite impractical from a production point of view because of the time involved in causing the instrument to operate at a given speed, measuring the voltage output, repeating this process for a large number of speeds, and then comparing the results to determine the extent to which individual readings depart from true linearity. It is also an undesirable procedure because of the inherent inaccuracies previously mentioned.

According to the present invention an accurate method and system has been devised to solve this problem, one which gives a measurement accuracy of 0.1% with simple equipment, which checks the operation of the instrument throughout its entire predetermined speed range in a continuous manner, which eliminates the necessity for determining the actual speed of operation at any given instant, and which continuously visually indicates the extent to which the speed-output relationship of the particular instrument departs from the norm, all independently of the actual magnitude of the instrument output.

Essentially, the method consists in comparing the output of the instrument to be checked with the output of a reference instrument known to have the desired speed-output relationship, the two instruments being driven at the same speed, usually by being connected together. The speed of operation of the instruments is continuously varied from one end of the desired speed range to the other, and means are provided for indicating any departure in the relationship between the output of the two instruments from that initially detected. It is important to note that the two instruments need not have the same voltage output at a given speed. The system is such that the load on the instrument being checked remains constant throughout the test, and the reference instrument is so electrically connected to the system that, for so long as the desired speed-output relationship of the instrument being checked prevails, no current flows through the reference instrument, thus greatly increasing the accuracy of the system, since the terminal voltage of the instrument being checked may always be compared with the terminal voltage of the reference instrument. The extent to which current flows through the reference instrument is therefore an accurate measure of the departure of the speed-output relationship of the instrument being checked from the speed-output relationship of the reference instrument. The magnitude of this current flow can be visually indicated or, where even greater accuracy is required, a null method can be employed, a variable bias cancelling out that current flow and the amount of bias applied to achieve this result thus being a measure of the departure of the instrument being checked from the conditions desired. This variable bias may readily be derived from the instrument being checked, thus requiring no external source of power in the system.

To the accomplishment of the above, and to such other objects as may hereinafter appear, the present invention relates to a method and system for checking the speed-output relationship of a generator, as defined in the appended claims and as described in this specification, taken together with the accompanying drawings in which:

The invention will be here described in connection with the checking of the speed-output relationship of a tachometer generator, which is in effect a D. C. generator of known type so designed that the voltage output thereof will be as close to linearity as possible with respect to the speed of rotation of its rotor. The tachometer generator to be checked is generally designated A. The reference tachometer generator is generally designated B, and is an instrument the speed-output relationship of which is known to be linear or sufficiently so to serve as a reference. Both generators are connected to a single driving means generally designated C, which may take the form either of an electric motor having a continuously variable speed or else a one-speed electric motor which, at its rate of speed, is capable of driving both generators A and B at a speed at the high end of the speed range within which linearity must be attained. The connection between the generators A and B and the motors C is generally designated by the broken line D and may take any desired form. Direct connections may be employed, or speed reduction gearings may be used, the former being preferable.

Figure 1:
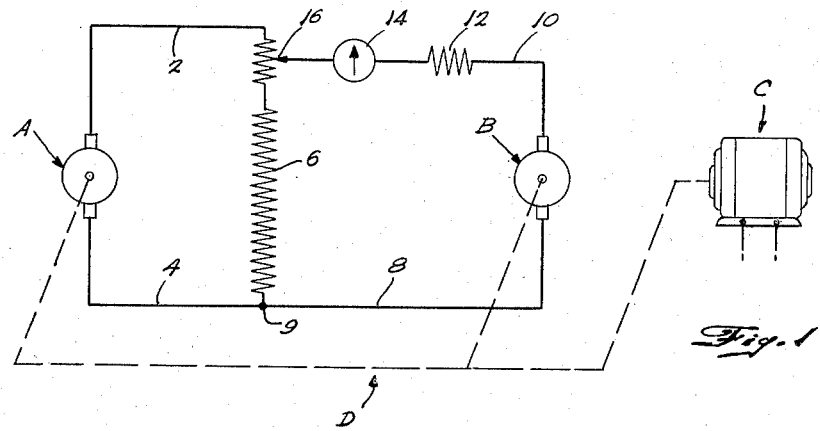
Fig. 1 is a schematic view of one embodiment of the present invention.

The output of the generator A being checked is connected by means of leads 2 and 4 across an impedance which, when D. C. generators are employed, as is here the case, desirably takes the form of a fixed resistor 6. One side of the output of the reference generator B is connected by means of lead 8 to the lower end 9 of the resistance 6. The other side of the output of the reference generator B is connected by means of lead 10, resistor 12 and milliammeter 14 to a tap 16 movable along the resistor 6. This circuit arrangement is shown in Fig. 1.

The driving motor C is energized and brought up to speed, preferably so as to drive the two generators A and B at a speed corresponding to the upper limit of the range of speeds within which checking is to take place. The generator A will cause a current to flow through the resistor 6, that current being proportional to the voltage output from the generator A. The tap 16 is adjusted along the resistor 6 until the milliammeter 14 indicates zero current flow. This will occur when the voltage drop in the resistor 6 between points 9 and 16 by reason solely of the current passing therethrough from the generator A exactly equals and opposes the terminal voltage of the reference generator B. Since, at this time, no current will be flowing through the leads 8 and 10, there will be no voltage drop in the resistor 12, and the entire terminal voltage of the generator B will be applied between the points 9 and 16.

Thereafter the speed of operation of the driving motor C is continuously reduced so that the generators A and B are driven at progressively lower speeds to the lower limit of the range of speeds within which linearity of the output-speed relationship is to be attained. If the generator A is operated at lower speeds, its terminal voltage will decrease, the current flowing through the resistor 6 will decrease, and the voltage drop between the points 9 and 16 or the resistor 6 will decrease proportionately. Simultaneously, the voltage output of the reference generator B, which is also being operated at progressively reduced speeds, will drop. So long as the voltage output of generator A, at any instant, bears the same relationship to the voltage output of the reference generator B as those outputs bore to one another when the tap 16 was initially positioned, the voltage drop between the points 9 and 16 on the resistance 6 will remain equal to the voltage output of the reference generator B, and the milliammeter 14 will continue to read zero. This will indicate exact conformity of the speed-output relationship of the generator A to that of the reference generator B. To whatever extent the relationship between the outputs of the generators A and B may depart from their initial relationship, a current will flow between the reference generator B and the resistor 6 and the magnitude of this current will be indicated by the milliammeter 14. That indication will be a measure of the departure of the speed-output relationship of the generator A from that of the reference generator B at the particular speed. Thus, as the speed of operation of the driving motor C is continuously varied from one extreme speed to the other, an observation of the milliammeter 14 will indicate whether or not, throughout that speed range, output of the generator A approaches linearity to the desired degree of accuracy.

It may be noted at this point that when the instrument 14 is a milliammeter, as is desirably the case when accuracy is required, the needle thereof may oscillate slightly because of commutation and noise voltages in the circuit. The mean position of the needle on the meter 14 is what is read. The commutation and noise errors only amount to approximately 1% of the total error, as read on a milliammeter, and consequently are entirely admissible.

Because of the existence in the circuit to the reference generator B of the resistor 12, in which a voltage drop is produced whenever current flows and the magnitude of which voltage drop is proportional to the current, certain errors are introduced into the system because the voltage applied between the tap 16 and the point 9 on the resistor 6 is not always the exact generated voltage of the reference generator B. Where this error cannot be tolerated, a null method may be employed to maintain zero current in the reference generator, in order to cancel out the current flowing therein. The voltage drop in the resistor 6 is utilized for that purpose, the position of the tap 16 along the resistor 6 being continuously varied as the speed of operation of the generators A and B are reduced so as to keep the current flow through the reference generator B at zero, as indicated by the milliammeter 14. In this method the departure of the speed-output relationship of the generator A from linearity will be indicated by the degree to which the tap 16 must be moved from its initial position in order to bring the milliammeter 14 to zero. An important advantage of the null method is that the voltage output of almost any tachometer generator B will be linear with respect to speed when the null current passes therethrough. As a practical matter only gross mechanical or electrical errors in the reference generator will cause its voltage output to be non-linear. Consequently great latitude in the selection of the generator to be employed as the reference is afforded when the null method is employed.

Where accuracy is to be maintained within a given percentage of the actual output at any given speed, the system of Fig. 1 has certain round drawbacks. To select round numbers by way of example, a one-volt "error" signal, that is to say, such a voltage difference between the terminal voltage of the reference generator B and the voltage between the points 9 and 16 on the resistor 6, will produce the same current flow in the reference generator circuit, and hence the same deflection of the reading on the milliammeter 14, whether the actual voltage output of the generators is 100 or 50 volts. In the first instance this would represent an error of 1%, but in the second instance it would represent an error of 2%. Thus the reading of the milliammeter 14 in the circuit of Fig. 1 is directly proportional to the "error" signal, but is not proportional to the percentage of the actual instantaneous output of the voltage generators represented by that "error" signal.

Figure 3:
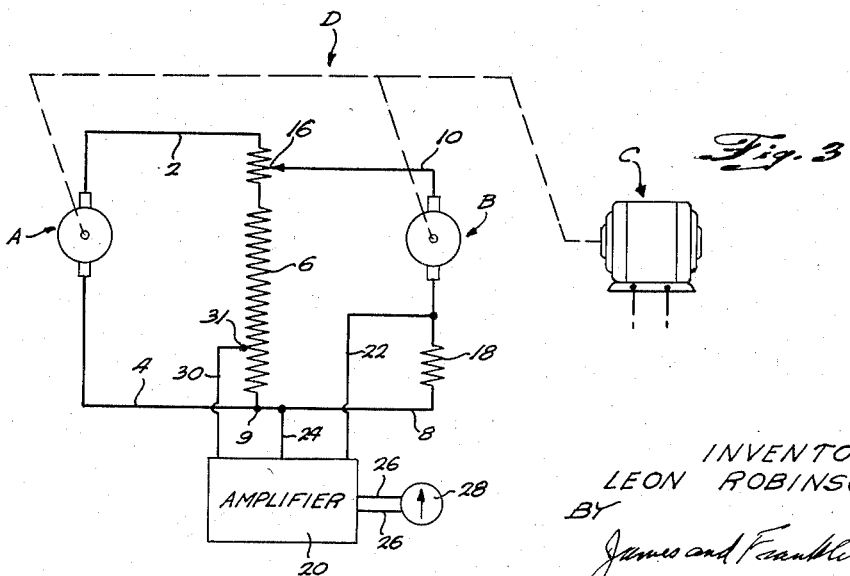
Fig. 3 is a schematic view illustrating a modified version of the checking scheme of Fig. 1.

The circuit of Fig. 3 is designed to provide a meter reading which is directly represented of the percentage error. There the resistor 12 and milliammeter 14 directly in the reference generator circuit of Fig. 1 are dispensed with, a resistor 18 being interposed in the lead 8 so as to be connected between the lower end 9 of the resistor 6 and the corresponding side of the reference generator B. Whatever current flows in the reference generator circuit will therefore create a voltage drop in the resistor 18 proportional thereto, that voltage drop being employed as an error signal and fed into an amplifier 20 by means of leads 22 and 24 connected respectively between the generator B and the resistor 18 and between the resistor 18 and the end 9 of the resistor 6. This signal is adapted to be amplified by the amplifier 20, which may take any suitable form—when D. C. generators A and B are employed it will, of course, be a D. C.

amplifier—and the output of the amplifier 20 is fed via leads 26 to instrument 28. The gain of the amplifier 20 is varied inversely with the actual voltage output of the generator A, this being accomplished by taking off a gain control signal from the resistor 6 by means of leads 24 and 30, the former being connected to the lower end 9 of the resistor 6 and the latter being connected to the resistor 6 at some appropriate point 31 along its length. The current through the resistor 6 will be proportional to the voltage output of the generator A, and hence the voltage between the points 9 and 31 on the resistor 6 will vary in direct proportion to the actual magnitude of the terminal voltage of the generator A. The potential difference between the leads 24 and 30 is so connected within the amplifier 20, in known manner, as to cause the gain of that amplifier, and hence the amplification of the "error" signal defined by the potential difference between the leads 22 and 24, to vary inversely therewith. The system of Fig. 3 can be employed either through direct reading of the meter 28 or through adjustment of the tap 16 according to the null method, as described above with respect to the circuit of Fig. 1.

Figure 2:
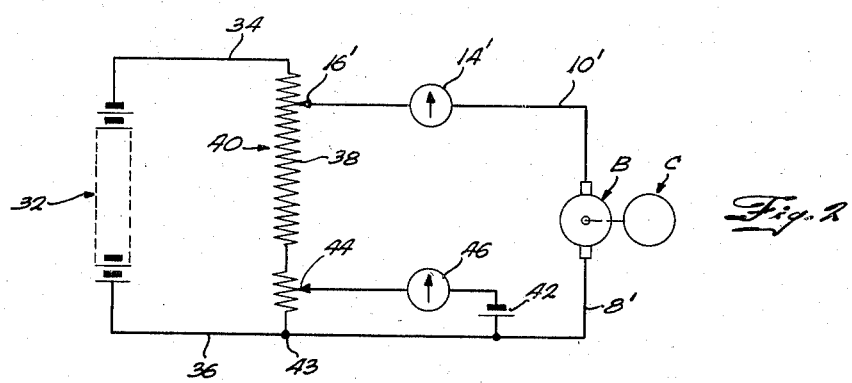
Fig. 2 is a schematic view illustrating one circuit which can be employed for checking the accuracy of the reference generator.

Fig. 2 represents a circuit which may be employed for the checking of the speed-output relationship of the reference generator B in order to be certain that it is appropriate for use as a reference. A highly regulated D. C. supply schematically designated 32 is connected by leads 34 and 36 to the resistor 38 forming a part of the potentiometer generally designated 40, the resistance 38 being of a material such as to be temperature-stable. The constancy of the D. C. source 32 is checked by connecting a standard cell 42 between the lower end 43 of the resistor 38 and a tap 44 on the resistor 38, an ammeter 46 being connected in the circuit. The position of the tap 44 is initially adjusted so that the instrument 46 reads zero. Any variation in the voltage supply 32 will cause a variation in the voltage drop between the points 43 and 44, and hence will cause a current to pass through the standard cell circuit, giving rise to deflection of the needle on the meter 46. The reference generator B is connected, by means of leads 8' and 10' respectively, between the lower end 43 of the resistor 38 and a tap 16' movable along the resistor 38, the milliammeter 14' being interposed in the circuit. The reference generator B is then rotated at a given speed, the position of the tap 16' along the resistor 38 is adjusted until the milliammeter 14' reads zero, and then the amount of resistance between the tap 16' and the lower end 43 of the resistor 38 is accurately measured in any appropriate manner, as by means of a bridge, such measurement being readily capable of achieving an accuracy of .05%. The speed of operation of the reference generator B is also determined to substantially the same accuracy. The procedure is repeated for as many different speeds of operation of the reference generator B as may be desired or practical, the test results are analyzed, and that generator whose speed-output relationship has been verified as being linear is selected as the reference generator B. It may be noted parenthetically that this procedure, time consuming and tedious, is comparable to the procedure which formerly was employed with each individual generator. According to the present system it need be employed only in the selection of the reference generator B, the individual generators A to be checked being utilized in the system of Fig. 1 or 3 and subjected to the methods of testing described with relation to those figures.

The value of the resistor 6 is preferably chosen so as to correspond to the load to which the generators A will be subjected when in actual use, the test conditions therefore being similar to those met in the field. It is also significant to note that the actual value of the voltage output of each individual generator A at a given speed need not be the same, nor need it be the same as or have exactly the same relation to the output of the reference generators B at that speed. Difference in these relationships are taken care of in the initial adjustment of the position of the tap 16 along the resistor 6, that being the only adjustment which is necessary in the system to accommodate in to the individual generator A to be checked. While in the description above the adjustment of the tap 16 has been described as taking place when the generators A and B are operated at the upper limit of the range of speeds within which testing is to occur, this is not at all necessary. The initial adjustment of the tap 16 may be carried out at the lower limit of that range of speeds, or at any desired point within that range. An advantage of making the adjustment at the upper limit of the speed range is that a single speed driving motor C, such as a synchronous motor, may be employed, so designed in conjunction with the means D connecting the motor C with the generators A and B that, when the motor C has come up to speed, the generators A and B are driven at the upper limit of the speed range within which checking is to occur. After the tap 16 has been adjusted, the motor C can be de-energized, the entire system then being permitted to coast to a standstill, the generators A and B thereby being driven at progressively decreasing speeds, the speeds changing sufficiently slowly so that readings of the meters 14 or 28 and, when the null method is employed, adjustments of the position of the tap 16, may readily be carried out.

The system of the present invention will be seen to be particularly adapted for the testing of large numbers of generators by reliably unskilled personnel. All that the tester must do is physically connect a given generator A to the driving motor C, electrically connect its output to the leads 2 and 4, close the switch to the driving motor C, adjust the tap 16 until the motor 14 or 28 reads zero, and then de-energize the motor C, after which he need merely observe the meter 14 or 28 and determine whether or not, within the range of speeds being considered, there is any excessive deflection of the meter needle.

While the instant invention has been here specifically described with respect to the testing of the output of tachometer generators for linearity with respect to speed, it will be obvious that the test could be carried out for any other speed-output relationship, provided only that the reference generator B had that desired relationship. It is further apparent that the method and system of the present invention could be adapted for use with A. C. generators, and that, when D. C. generators are involved, polarity as well as magnitude of the error signal can be detected.

While but two embodiments of specific systems incorporating the present invention have been here disclosed, it will be apparent that many variations may be made therein, all within the scope of the invention as defined in the following claims.

I claim:

1. The method of checking over a range of speeds the relationship between the output of a generator and the speed at which it is operating which comprises operating said generator at a plurality of speeds over said range of speeds, simultaneously operating a reference generator known to have the desired speed-output relationship at the same speeds as said generator being checked, and detecting any differences in the relationship between the outputs of the two generators.

2. The method of claim 1, in which said generators are operated at a speed continuously varied from one end of said range to the other.

3. The method of checking over a range of speeds the relationship between the output of a generator and the speed at which it is operating which comprises operating said generator at a plurality of speeds over said range of speeds and feeding its output into an impedance, simultaneously operating a reference generator known to have the desired speed-output relationship at the same speeds as said generator being checked, feeding the output of said reference generator into the same impedance across points such that at a given speed the voltage drop in said impedance between said points produced by the output of said generator being checked is equal to the voltage output of said reference generator, and detecting any current flow between said reference generator and said impedance.

4. The method of claim 3, in which said generators are operated at a speed continuously varied from one end of said range to the other.

5. In the method of claim 3, amplifying a signal derived from said detected current flow, and varying the degree of amplification thereof inversely with the magnitude of the output from said generator being checked.

6. The method of claim 5, in which said generators are operated at a speed continuously varied from one end of said range to the other.

7. In the method of claim 3, adjusting, as said speed of operation varies, one of the points on said impedance to which said reference generator is connected so that said detected current flow is brought to zero, and measuring the amount of adjustment necessary at various speeds.

8. The method of claim 7, in which said generators are operated at a speed continuously varied from one end of said range to the other.

9. A system for checking over a range of speeds the relationship between the output of a generator and the speed at which it is operating which comprises a reference generator known to have the desired speed-output relationship, means for driving said reference generator at a plurality of speeds over said range of speeds, means for operatively connecting the generator being checked to said driving means so that both generators are simultaneously driven at the same speeds, an impedance, the output of said generator being checked being connected across said impedance, the output of said reference generator being connected across that portion of said impedance such that at a given speed the voltage drop across said portion by reason of the output of said generator being checked equals the voltage output of said reference generator, and means in the circuit between said reference generator and said impedance for detecting current flow.

10. The system of claim 9, in which one of the points at which said reference generator is connected to said impedance is adjustable along said impedance.

11. The system of claim 9, in which said detecting means comprises a variable gain amplifier, a resistor between said reference generator and said impedance, electrical connections between said resistor and said amplifier whereby a signal is fed into said amplifier in accordance with the voltage drop across said resistor, and electrical connections between said impedance and said amplifier whereby the gain of said amplifier is inversely varied in accordance with the current flow through said impedance, and hence in accordance with the output of said generator being checked.

12. The method of checking over a range of speeds the relationship between the output of a generator and the speed at which it is operating which comprises operating said generator at a plurality of speeds over said range of speeds so as to produce a voltage output, simultaneously operating a reference generator known to have the desired speed-output relationship at the same speeds as said generator being checked so as to produce a voltage output, coupling said voltage outputs in opposition in such a way that at a given speed the voltage output from one of said generators is blocked by an equal and opposite voltage derived from the other of said generators, thereby preventing current flow through said one of said generators at said given speed, and detecting any current flow through said one of said generators at speeds other than said given speed.

13. The method of claim 12, in which said generators are operated at a speed continuously varied from one end of said range to the other.

14. In the method of claim 12, amplifying a signal derived from said detected current flow, and varying the degree of amplification thereof inversely with the magnitude of the output from said other of said generators.

15. The method of claim 14, in which said generators are operated at a speed continuously varied from one end of said range to the other.

16. The method of checking over a range of speeds the relationship between the output of a generator and the speed at which it is operating which comprises operating said generator at a plurality of speeds over said range of speeds so as to produce a voltage output, simultaneously operating a reference generator known to have the desired speed-output relationship at the same speeds as said generator being checked so as to produce a voltage output, coupling said voltage outputs in opposition in such a way that at a given speed the voltage output from said reference generator is blocked by an equal and opposite voltage derived from said generator being checked, thereby preventing current flow through said reference generator at said given speed, and detecting any current flow through said reference generator at speeds other than said given speed.

17. The method of claim 16, in which said generators are operated at a speed continuously varied from one end of said range to the other.

18. In the method of claim 16, amplifying a signal derived from said detected current flow, and varying the degree of amplification thereof inversely with the magnitude of the output from said generator being checked.

19. The method of claim 18, in which said generators are operated at a speed continuously varied from one end of said range to the other.

20. A system for checking over a range of speeds the relationship between the output of a generator and the speed at which it is operating which comprises a reference generator known to have the desired speed-output relationship, means for driving said reference generator at a plurality of speeds over said range of speeds so as to produce a voltage output, means for operatively connecting the generator being checked to said driving means so that both generators are simultaneously driven at the same speeds, thereby producing a voltage output from said generator being checked, means for coupling the voltage outputs of said two generators in opposition in such a way that at a given speed the voltage output from one of said generators is blocked by an equal and opposite voltage derived from the other of said generators, thereby preventing current flow through said one of said generators at said given speed, and means in the circuit between said one of said generators and said voltage coupling means for detecting current flow.

21. The system of claim 20, in which said detecting means comprises a variable gain amplifier, a resistor between said one of said generators and said voltage coupling means, electrical connections between said resistor and said amplifier whereby a signal is fed into said amplifier in accordance with the voltage drop across said resistor, and electrical connections between the voltage output of said other of said generators, whereby the gain of said amplifier is inversely varied in accordance with the voltage output of said other of said generators.

22. A system for checking over a range of speeds the relationship between the output of a generator and the speed at which it is operating which comprises a reference generator known to have the desired speed-output relationship, means for driving said reference generator at a plurality of speeds over said range of speeds so as to produce a voltage output, means for operatively connecting the generator being checked to said driving means so that both generators are simultaneously driven at the same speeds, thereby producing a voltage output from said generator being checked, means for coupling the voltage outputs of said two generators in opposition in such a way that at a given speed the voltage output from said reference generator is blocked by an equal and opposite voltage derived from said generator being checked, thereby preventing current flow through said reference generator at said given speed, and means in the circuit between said reference generator and said voltage coupling means for detecting current flow.

23. The system of claim 20, in which said detecting means comprises a variable gain amplifier, a resistor between said reference generator and said voltage coupling means, electrical connections between said resistor and said amplifier whereby a signal is fed into said amplifier in accordance with the voltage drop across said resistor, and electrical connections between said amplifier and the voltage output of said generator being checked, whereby the gain of said amplifier is inversely varied in accordance with the voltage output of said generator being checked.

References Cited in the file of this patent

UNITED STATES PATENTS

| | | |
|---|---|---|
| 2,447,209 | Rendel | Aug. 17, 1948 |
| 2,624,783 | Nedzel | Jan. 6, 1953 |

FOREIGN PATENTS

| | | |
|---|---|---|
| 407,222 | Germany | Dec. 18, 1924 |
| 644,858 | Germany | May 14, 1937 |